(12) United States Patent
Fukushima et al.

(10) Patent No.: US 10,727,467 B2
(45) Date of Patent: Jul. 28, 2020

(54) WIRING MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Naoki Fukushima, Yokkaichi (JP); Osamu Nakayama, Yokkaichi (JP); Katsushi Miyazaki, Yokkaichi (JP); Seishi Kimura, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 94 days.

(21) Appl. No.: 16/060,307

(22) PCT Filed: Nov. 30, 2016

(86) PCT No.: PCT/JP2016/085505
§ 371 (c)(1),
(2) Date: Jun. 7, 2018

(87) PCT Pub. No.: WO2017/104412
PCT Pub. Date: Jun. 22, 2017

(65) Prior Publication Data
US 2018/0358602 A1    Dec. 13, 2018

(30) Foreign Application Priority Data

Dec. 15, 2015   (JP) ................. 2015-243910
May 26, 2016    (JP) ................. 2016-105136

(51) Int. Cl.
*H01M 2/20*     (2006.01)
*H01M 10/48*    (2006.01)
(Continued)

(52) U.S. Cl.
CPC ......... *H01M 2/206* (2013.01); *H01M 2/1077* (2013.01); *H01M 10/482* (2013.01); *H01M 2220/20* (2013.01); *H01R 11/11* (2013.01)

(58) Field of Classification Search
None
See application file for complete search history.

(56) References Cited

U.S. PATENT DOCUMENTS 6,346,011 B1    2/2002  Ikeda
9,065,123 B2    6/2015  Kako et al.
2014/0363711 A1 12/2014 Zhao

FOREIGN PATENT DOCUMENTS

| JP | 2013093227 A | 5/2013 |
| JP | 2013143181 A | 7/2013 |
| JP | 2015041586 A | 3/2015 |

OTHER PUBLICATIONS

International Search Report for Application No. PCT/JP2016/085505 dated Mar. 7, 2017; 5 pages.

*Primary Examiner* — Jonathan G Leong
*Assistant Examiner* — Kirsten B Tysl
(74) *Attorney, Agent, or Firm* — Reising Ethington, P.C.

(57) ABSTRACT

A wiring module comprising: a detection wire that has a core wire and an insulating coating covering the core wire and that detects a state of a power storage element, a bus bar, and a wire connection portion formed on the end portion of the bus bar and to which the end portion of the detection wire is connected. The wire connection portion includes a core wire connection portion to which the core wire of the detection wire is connected. The core wire connection portion includes a first core wire connection portion for (Continued)

drawing out the detection wire in one direction and a second core wire connection portion for drawing out the detection wire in another direction that is different from the one direction.

10 Claims, 9 Drawing Sheets

(51) Int. Cl.
*H01M 2/10* (2006.01)
*H01R 11/11* (2006.01)

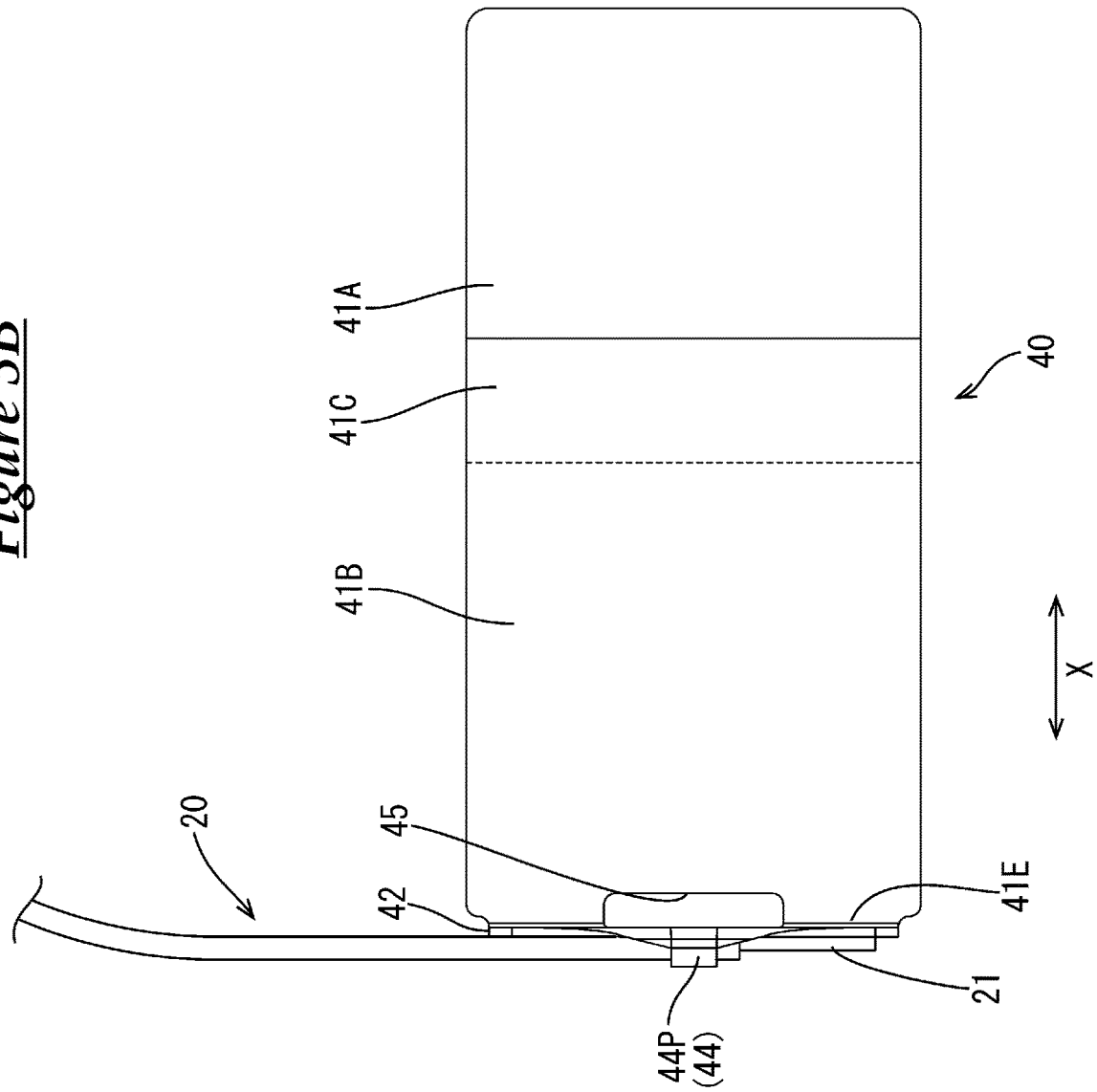

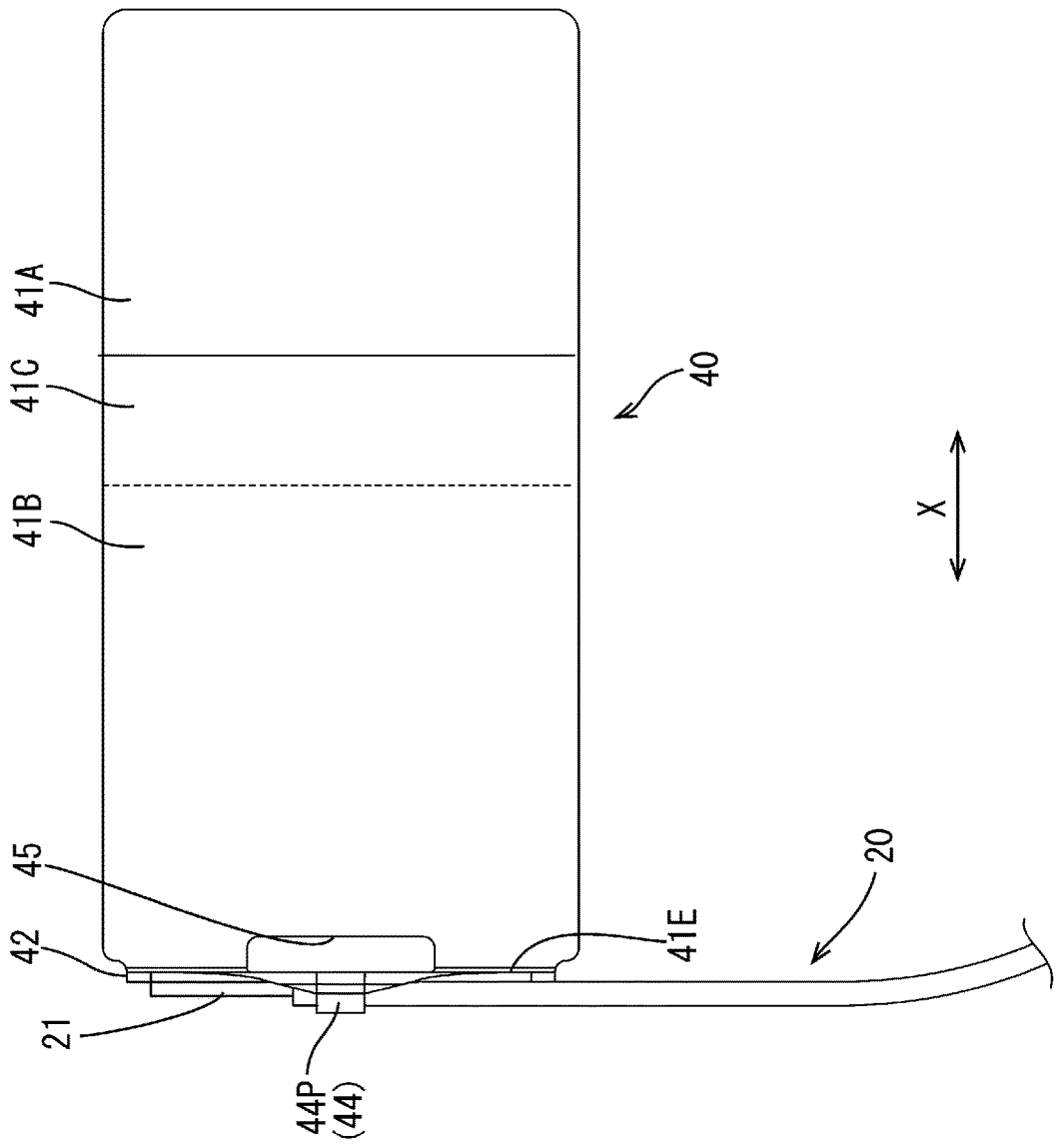
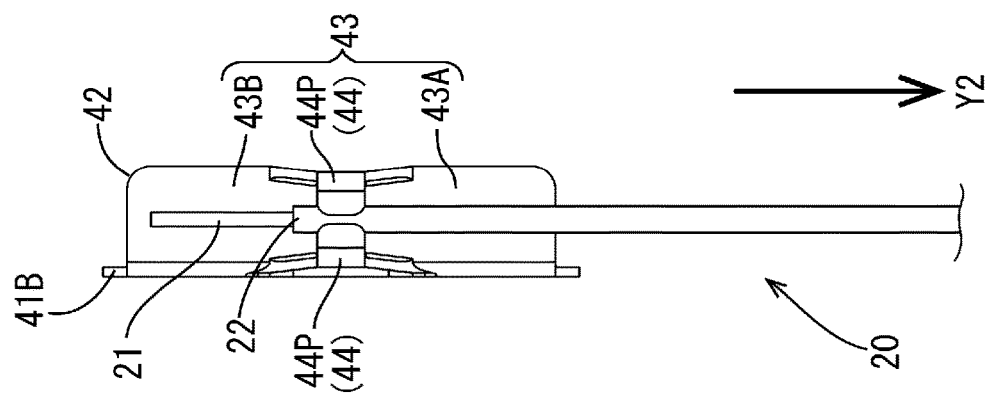

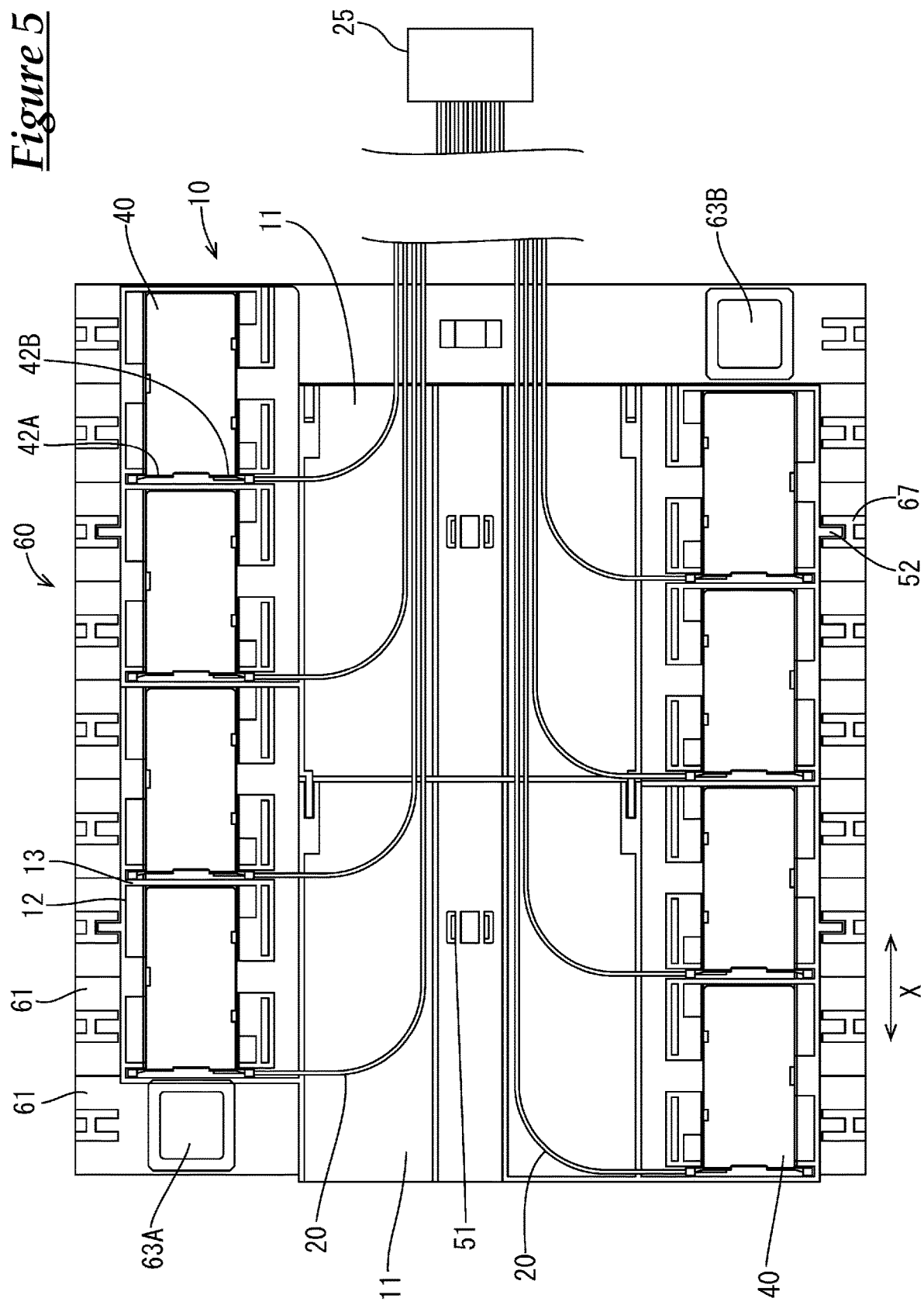

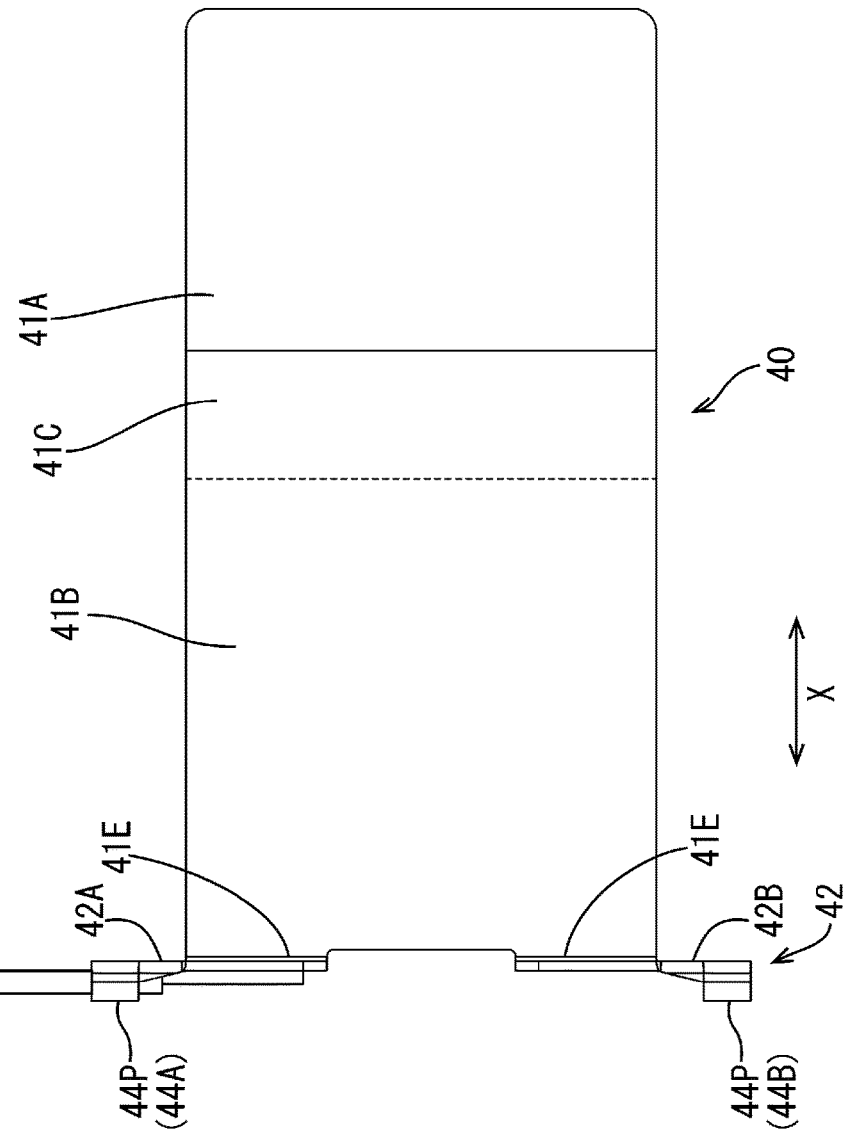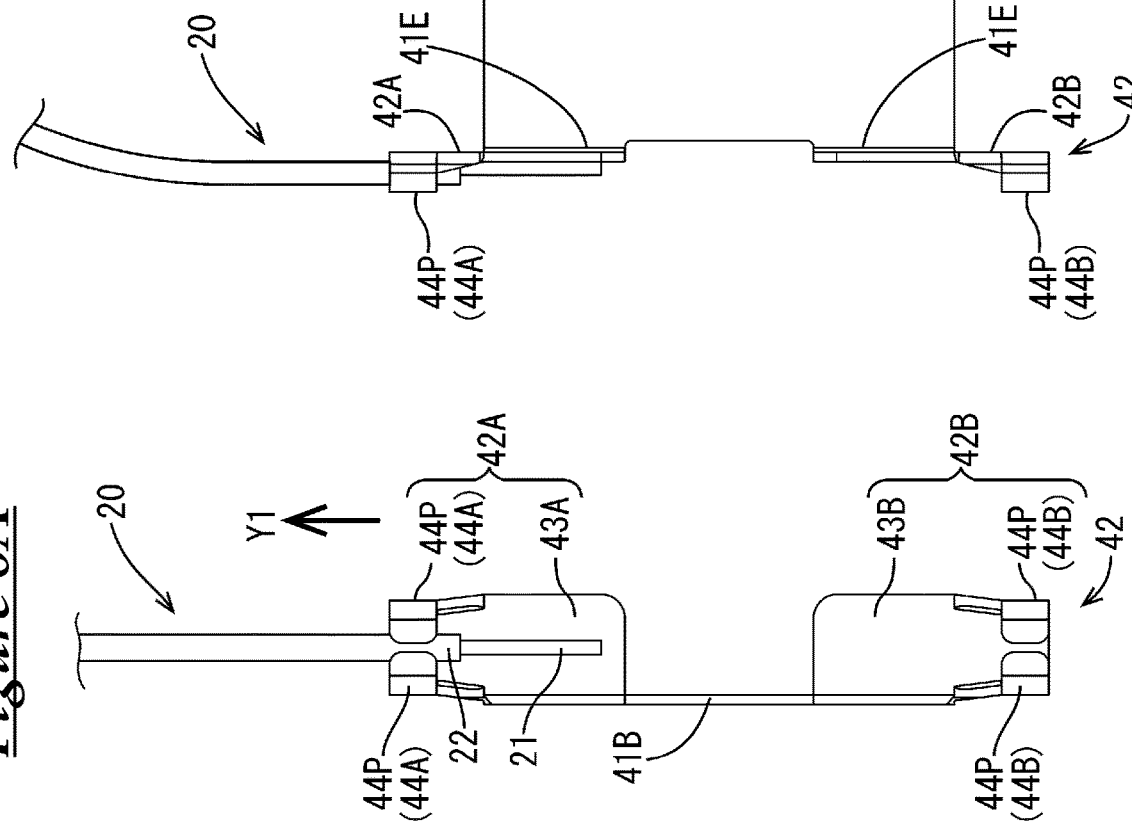

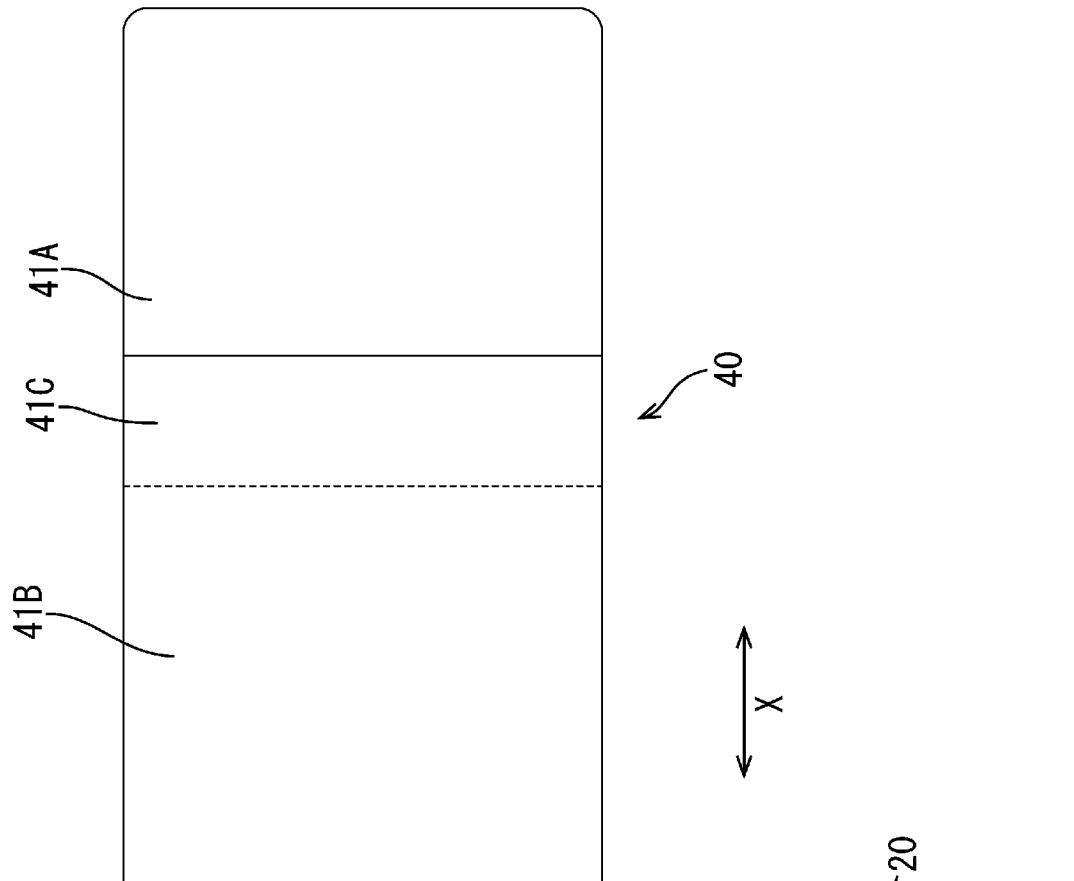
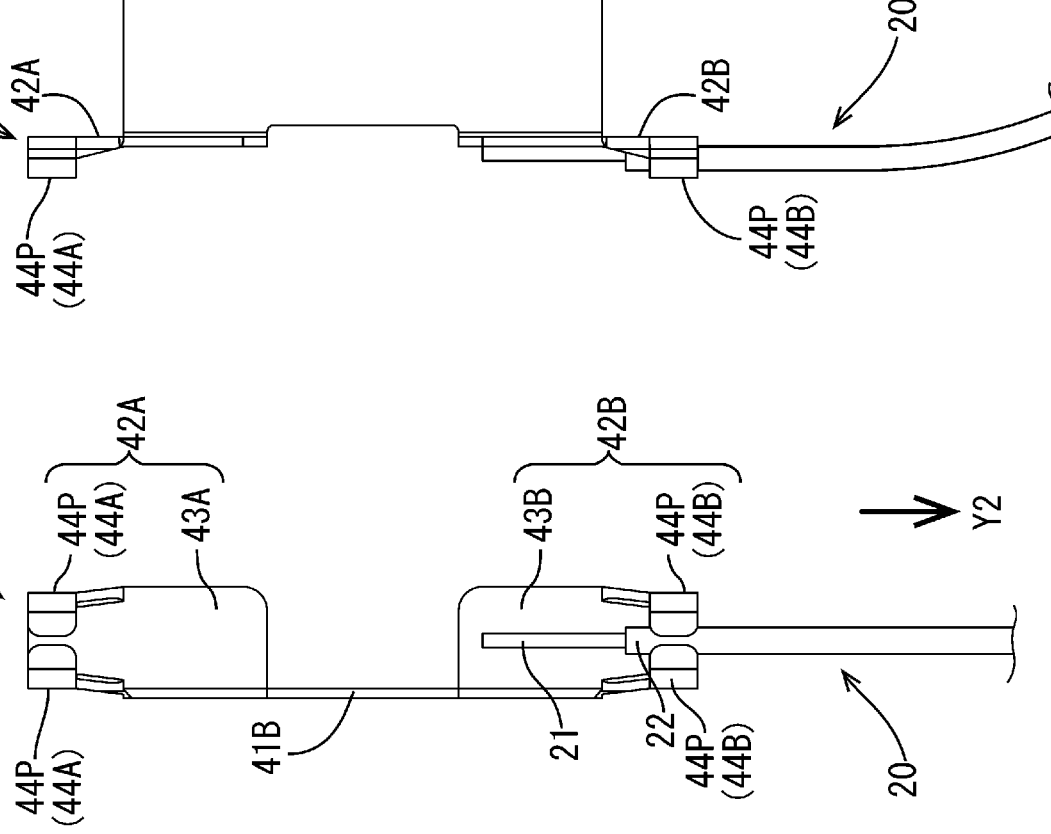

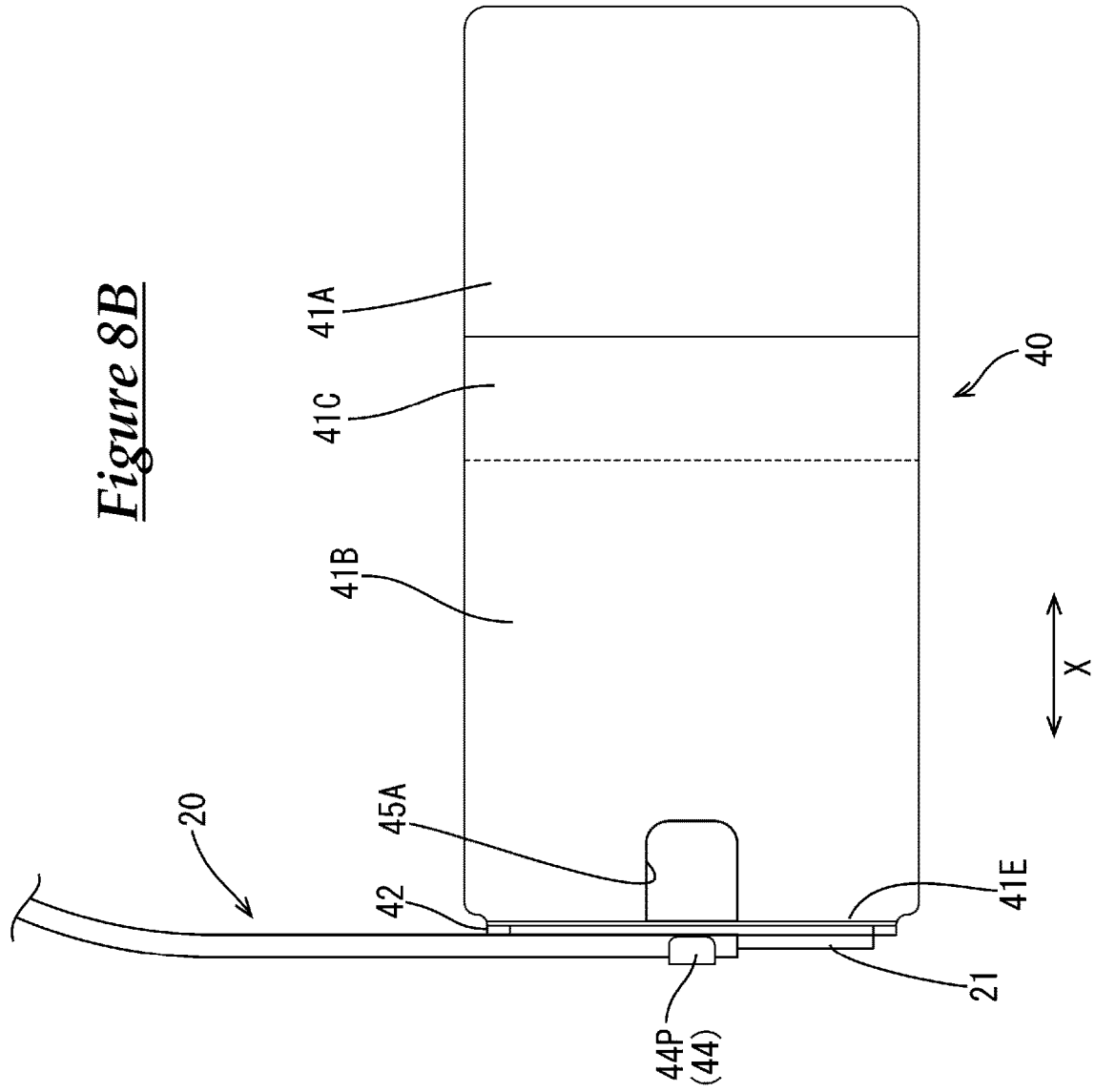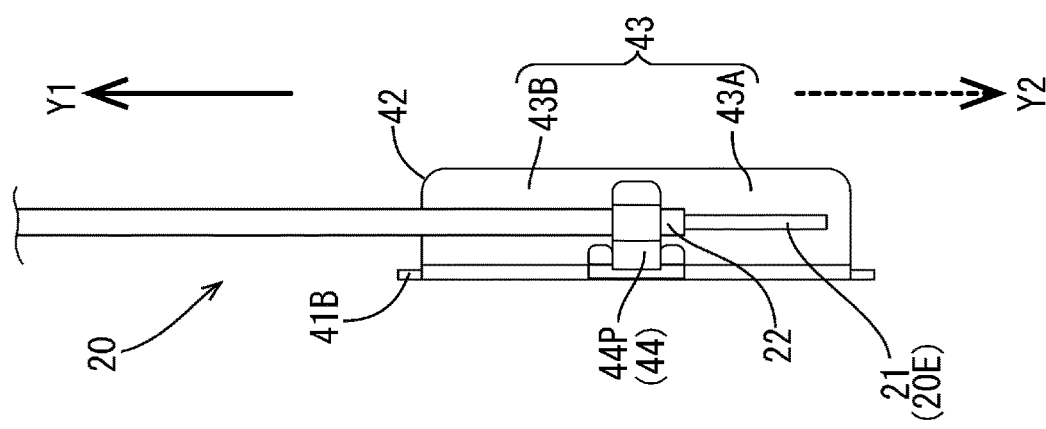

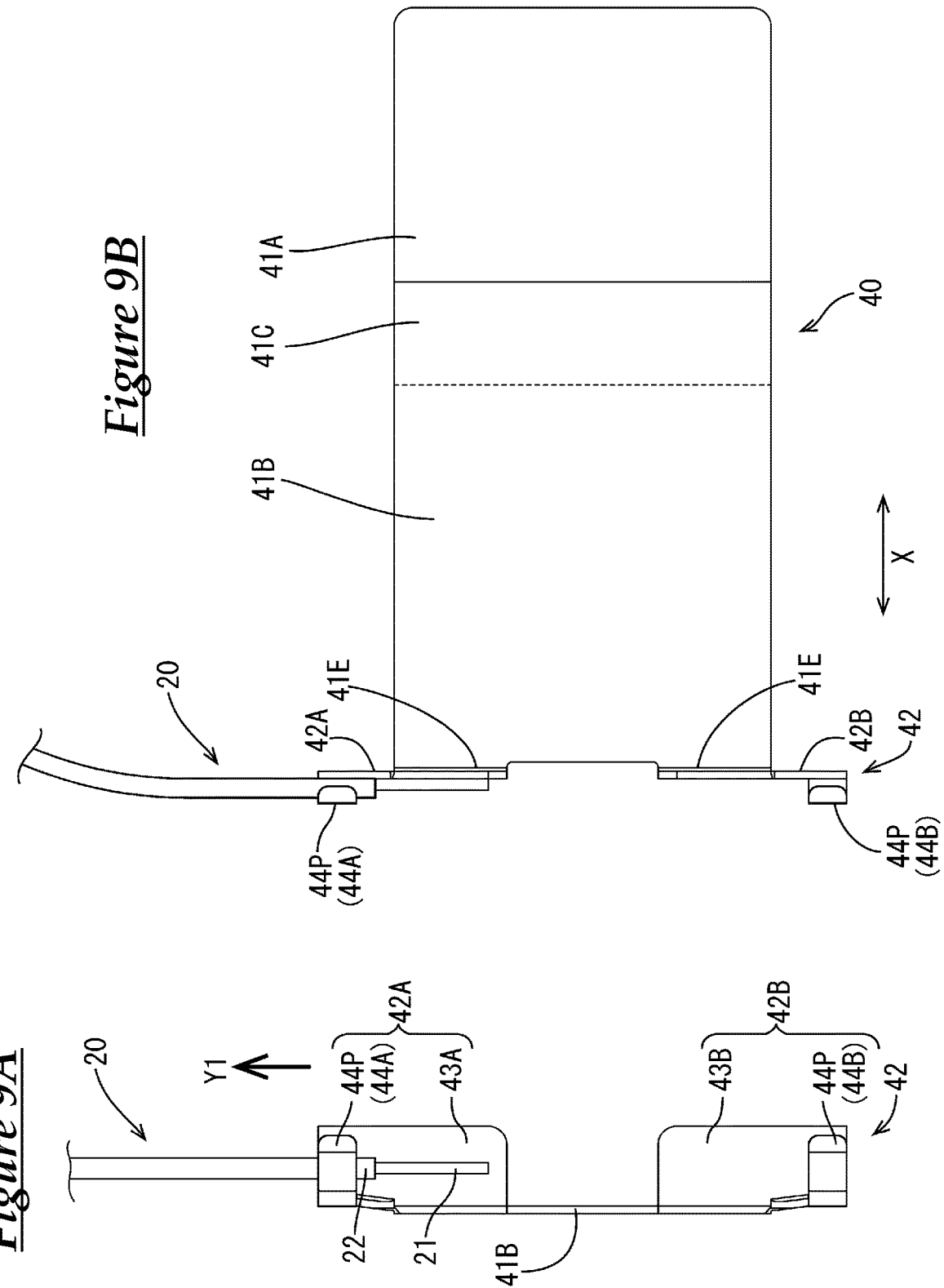

WIRING MODULE

CROSS REFERENCE TO RELATED APPLICATIONS

This application claims the priority of Japanese patent application JP2015-243910 filed on Dec. 15, 2015 and JP2016-105136 filed on May 26, 2016, the entire contents of both applications are incorporated herein by reference.

TECHNICAL FIELD

The technology disclosed in the present specification relates to a wiring module that is attachable to a plurality of power storage elements, and more specifically, to the connection of a detection wire that is arranged in the wiring module and that detects a state of the power storage element.

BACKGROUND ART

Conventionally, as a wiring module that is attachable to a plurality of power storage elements, for example, a wiring module as described in Patent Document 1 (JP2013-143181A) is known. Patent Document 1 discloses a technology for connecting a detection wire to a bus bar with a wire connection portion consisting of a wire barrel portion (core wire connection portion) that connects electrode terminals of adjacent single batteries (power storage elements) and an insulation barrel portion (crimping portion) that holds the detection wire, which are arranged in the middle of the bus bar in plan view. With this conventional art, it is possible to connect the detection wires to the bus bars with the same wire connection portions consisting of the wire barrel portion and the insulation barrel portion even if the bus bars are arranged in two rows, in accordance with the layout of the single batteries, that is, in accordance with the layout of the power storage elements.

SUMMARY

Considering, for example, the layout of the power storage elements, it is desirable that the detection wires can be drawn out in multiple directions relative to the bus bars. However, when the wire connection portions including the insulation barrel portions as described in the conventional art are formed on end portions of the bus bars in an direction in which the power storage elements are lined up, the directions in which the detection wires are drawn out from the bus bars are fixed to a single direction. Therefore, when the detection wires are to be drawn out in different directions, it is necessary to provide bus bars having different shapes. In this case, the number of components of the wiring module increases. For this reason, a configuration of a wire connection portion has been desired with which, when detection wires are drawn out from the bus bars in different directions, the detection wires can be drawn out from the same kind of bus bars regardless of the end portions of the bus bars on which wire connection portions are formed.

The technology disclosed in the present specification has been conceived based on the foregoing circumstances, and aims to provide a wiring module with which the detection wires can be drawn out in different directions with bus bars of a single kind, regardless of the end portions of the bus bars on which wire connection portions are formed.

A wiring module disclosed in the present specification is a wiring module that is attachable to a plurality of power storage elements that each have a pair of positive and negative electrode terminals, the wiring module including: a bus bar that connects the electrode terminals of two adjacent power storage elements to each other, an insulating protector that includes a bus bar holding portion that holds the bus bar; a detection wire that has a core wire and an insulating coating wire, is arranged on the insulating protector, and detects a state of the power storage elements; and a wire connection portion that is formed on the end portion of the bus bar, the end portion of the detection wire being connected to the wire connection portion. The wire connection portion includes a core wire connection portion to which the core wire of the detection wire is connected, and the core wire connection portion includes a first core wire connection portion for drawing out the detection wire in one direction, and a second core wire connection portion for drawing out the detection wire in another direction that is different from the one direction.

With this configuration, the core wire connection portion of the wire connection portion, that is formed on the bus bar, includes core wire connection portions at two places, namely the first core wire connection portion for drawing out the detection wire in the one direction, and the second core wire connection portion for drawing out the detection wire in the other direction that is different from the one direction. With the first core wire connection portion and the second core wire connection portion, it is possible to draw out the detection wires in different directions with bus bars of a single kind, regardless of the end portions of the bus bars on which the wire connection portions are formed. Accordingly, it is not necessary to provide bus bars having different shapes when the detection wires are drawn out in multiple directions relative to the bus bars in consideration of e.g. the layout of the power storage elements.

In the above-described wiring module, the wire connection portion may have a crimping portion that can be crimped to the insulating coating of the detection wire, and the crimping portion may be provided between the first core wire connection portion and the second core wire connection portion.

With this configuration, the detection wires can be drawn out from the bus bars in different directions with a configuration in which the crimping portion is provided at one place on the wire connection portion. In other words, it is possible to draw out the detection wires from the bus bars in different directions with a simple configuration of the wire connection portions.

Furthermore, the above-described wiring module may comprise a first wire connection portion that includes the first core wire connection portion and a first crimping portion that can be crimped to the insulating coating of the detection wire when the detection wire is drawn out in the one direction, and a second wire connection portion that includes the second core wire connection portion and a second crimping portion that can be crimped to the insulating coating of the detection wire when the detection wire is drawn out in the other direction that is different from the one direction.

With this configuration, each bus bar is provided with a specific wire connection portion (the first or second wire connection portion), depending on the direction for drawing out the detection wire from the bus bar. Accordingly, also in this configuration, the detection wires can be drawn out in different directions with bus bars of a single kind.

In this case, preferably, the first crimping portion and the second crimping portion may also be provided in a state protruding outward of the bus bar in plan view.

With this configuration, the task of crimping the first crimping portion or the second crimping portion to the insulating coating of the detection wire becomes easy.

Furthermore, in the above-described wiring module, a configuration is also possible in which the first core wire connection portion and the second core wire connection portion are provided on the wire connection portion such that the one direction and the other direction are opposite directions.

With this configuration, in the wiring module in which the bus bars are arranged in two rows in accordance with the layout of the power storage elements, the connection of the detection wires to the bus bars and the wiring can be handled with bus bars of a single kind.

According to the wiring module disclosed in the present specification, it is possible to draw out detection wires in different directions with bus bars of a single kind regardless of the end portions of the bus bars on which the wire connection portions are formed.

BRIEF DESCRIPTION OF DRAWINGS

FIG. 3A is a side view and FIG. 3B is a plan view showing a way how a detection wire is drawn out from a bus bar according to Embodiment 1.

FIG. 4A is a side view and FIG. 4B is a plan view showing another way how the detection wire is drawn out from the bus bar according to Embodiment 1.

FIG. 5 is a schematic plan view showing how the wiring module according to Embodiment 2 is attached to the power storage element group.

FIG. 6A is a side view and FIG. 6B is a plan view showing a way how the detection wire is drawn out from the bus bar according to Embodiment 2.

FIG. 7A is a side view and FIG. 7B is a plan view showing another way how the detection wire is drawn out from the bus bar according to Embodiment 2.

FIG. 8A is a side view and FIG. 8B is a plan view showing another way how the detection wire is drawn out from the bus bar according to Embodiment 1.

FIG. 9A is a side view and FIG. 9B is a plan view showing another way how the detection wire is drawn out from the bus bar according to Embodiment 2.

DESCRIPTION OF EMBODIMENTS

Embodiment 1

Embodiment 1 will be described with reference to FIGS. 1 to 4. A power storage module 100 as shown in FIG. 1 is mounted on a vehicle (not shown) such as an electric vehicle or a hybrid vehicle and used as a power source for driving the vehicle.

In the following description, "left" refers to the left side of FIG. 1, and "right" refers to the right side of FIG. 1. Furthermore, there may be cases where reference signs are given to some of a plurality of the same members and are not given to the remaining members.

Figure 1:
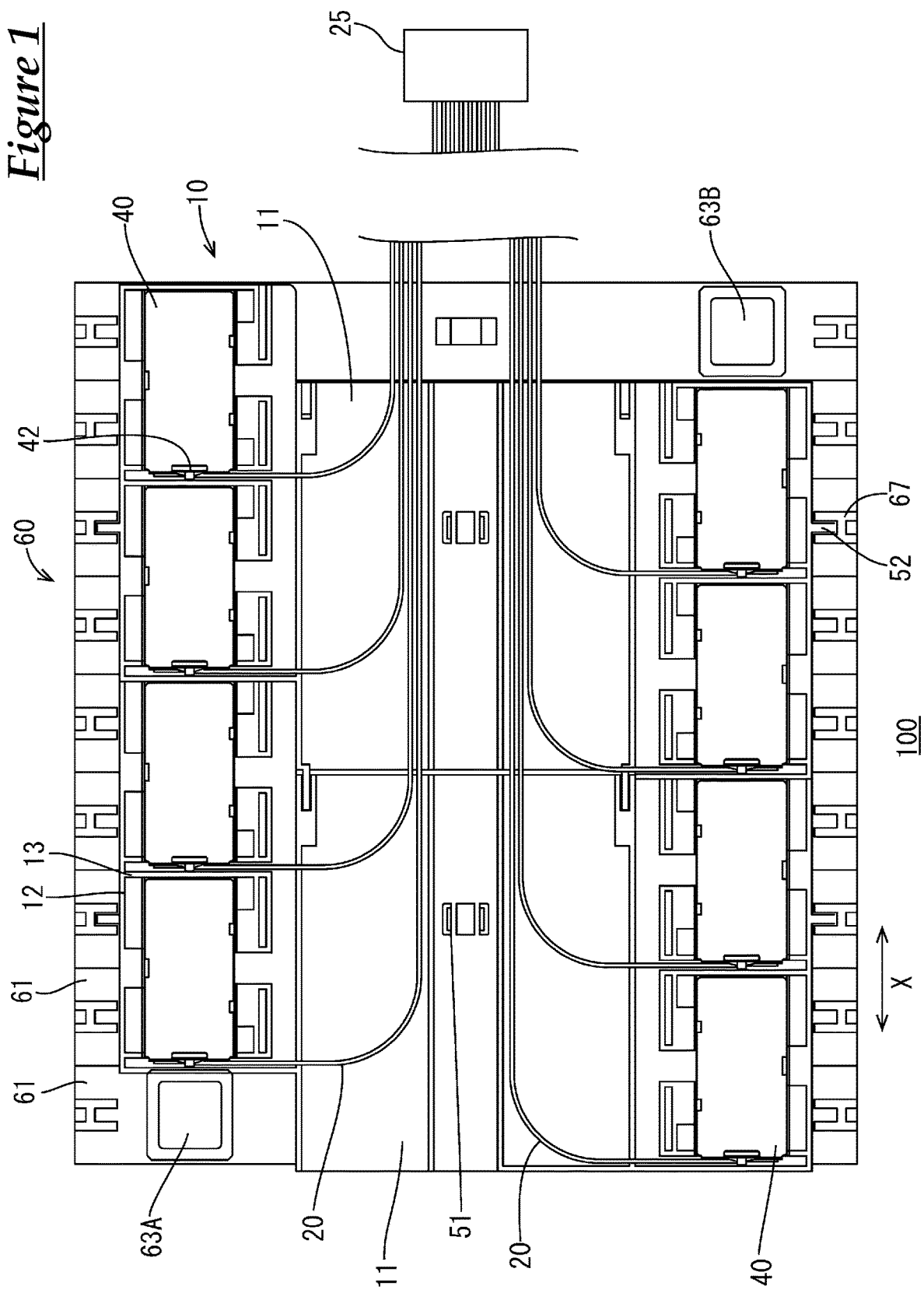
FIG. 1 is a schematic plan view showing how a wiring module according to Embodiment 1 is attached to a power storage element group.
Figure 2:
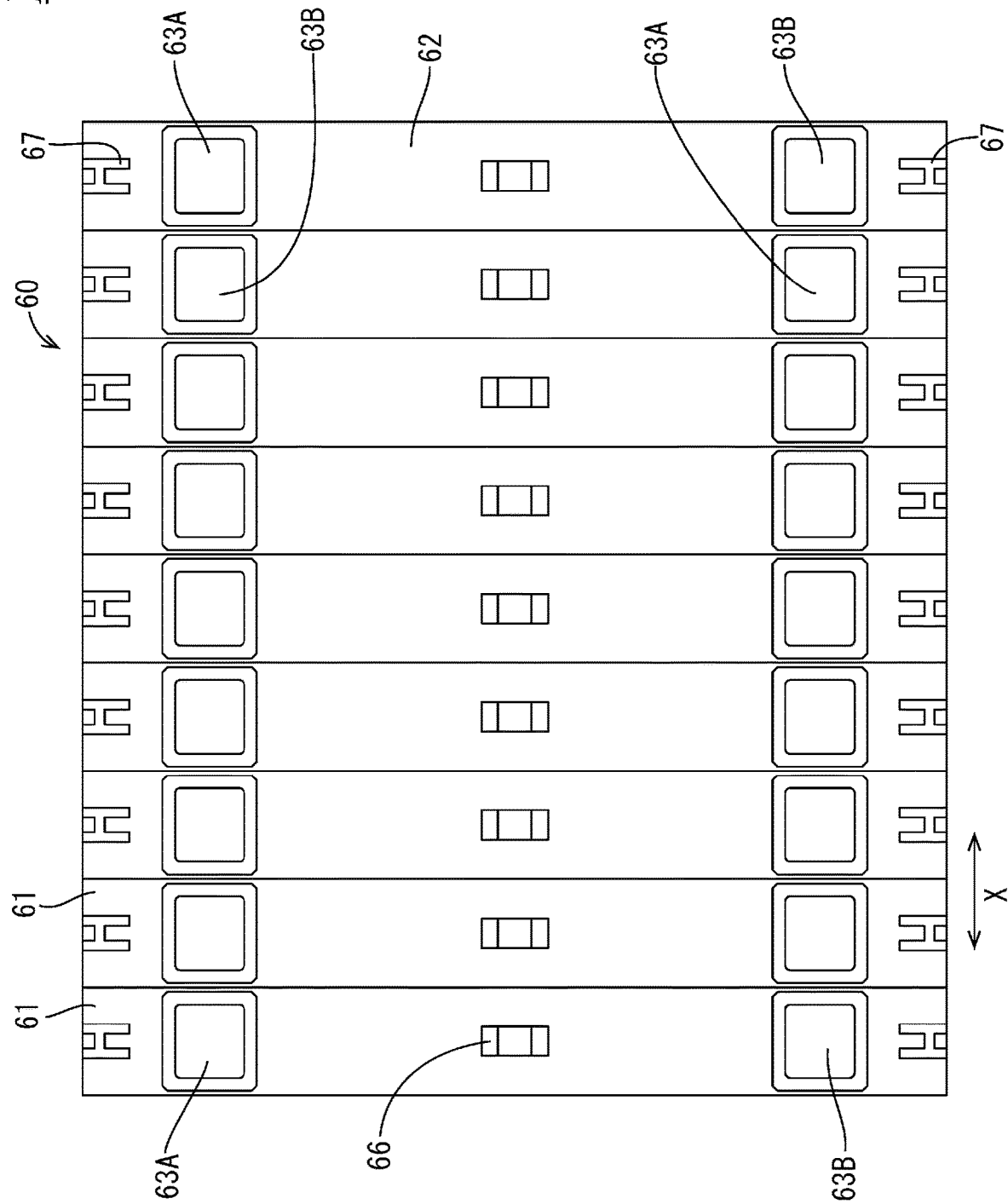
FIG. 2 is a side view of the power storage element group.

As shown in FIGS. 1 and 2, a power storage module 100 according to this embodiment is, as a whole, constituted of a power storage element group 60 (see FIG. 2) that is formed by lining up a plurality of power storage elements 61, and a wiring module 10 attached onto the power storage element group 60.

The power storage elements 61 are, for example, secondary batteries. As shown in FIG. 2, a power storage element group 60 is formed by lining up a plurality (nine in this embodiment) of power storage elements 61 in a row.

The power storage elements 61 have outer shapes that are flat rectangular parallelepipeds, and as shown in FIG. 2, each have an electrode arrangement surface 62 that is perpendicular to the faces of adjacent power storage elements 61. A pair of electrode terminals 63 is arranged respectively at positions near the two end portions in length direction of the electrode arrangement surface 62. One of the electrode terminals 63 is a positive terminal 63A and the other is a negative terminal 63B. The electrode terminals 63 are made of metal and protrude from the electrode arrangement surface 62 in the form of rectangular tubes. In this embodiment, the positive terminal 63A is made of aluminum, and the negative terminal 63B is made of copper. Note that the materials for the electrode terminals are not limited thereto. The positive terminal 63A and the negative terminal 63B may both be made of copper, for example.

A fitting portion 66 for being fitted to a positioning portion 51 of insulating protectors 11, with which the wiring module 10 is provided, is provided in the middle between the pair of electrode terminals 63 on the electrode arrangement surface 62 of the power storage element 61. Also, fitting portions 67 for being fitted to protruding portions 52 of the insulating protectors 11 are provided on the two end portions of the electrode arrangement surface 62 of the power storage element 61.

The plurality of power storage elements 61 are lined up such that electrode terminals 63 with different polarities are adjacent to each other in any two adjacent power storage elements 61 (in other words, the positive terminal 63A of one power storage element 61 is adjacent to the negative terminal 63B of the neighboring power storage element(s) 61).

The wiring module 10 is a member that is assembled to a surface constituted of the electrode arrangement surfaces 62 of the power storage elements 61 in the power storage element group 60. As shown in FIG. 1, for example, the wiring module 10 has two insulating protectors 11, bus bars 40 that are held by the insulating protectors 11 and connect positive terminals 63A and negative terminals 63B, of the adjacent power storage elements 61, wire connection portions 42 formed on the bus bars 40, and detection wires 20 connected to the wire connection portions 42, and the like.

As shown in FIG. 3A, each detection wire 20 has a core wire 21 and an insulating coating 22 covering the core wire 21, is arranged on the insulating protector 11, and detects a state of the power storage element 61, which in this embodiment is the voltage of the power storage element 61. One end (end portion) 20E of the detection wire 20 is connected to the wire connection portion 42, and the other end is connected to a connector 25 (see FIG. 1). The connector 25 is connected to an external control unit or the like (not shown) that processes the detected information.

As shown in FIG. 3B, the bus bar 40 is a plate-shaped member that is approximately rectangular as a whole, and whose four corners are cut out in flat rectangular shapes. Specifically, the bus bar 40 is formed by, for example, punching a clad material (metal plate) formed by bonding together two kinds of metal plates, namely an aluminum thin sheet 41A and a copper thin sheet 41B. In other words, the bus bar 40 includes the aluminum thin sheet 41A corresponding to an aluminum positive terminal 63A, the copper thin sheet 41B corresponding to a copper negative terminal 63B, and a bonding portion 41C. Note that, the materials for the bus bar 40 are not limited thereto, and other examples thereof include copper alloys, aluminum alloys, and stainless steel (SUS). Furthermore, the material is not limited to a clad material either, and may also be a single kind of metal plate.

In addition, as shown in FIGS. 3 and 4, the wire connection portion 42 is formed on the bus bar 40 as a part thereof. In this embodiment, the wire connection portion 42 is formed by punching and bending the copper thin sheet 41B that is part of the bus bar 40. Also, as shown in FIG. 3B, the wire connection portion 42 is formed on an end portion 41E of the bus bar 40 in the direction in which the plurality of power storage elements 61 are lined up (X direction shown e.g. in FIG. 2). Note that, depending on the layout of the power storage elements 61, the positional relationship between the aluminum thin sheet 41A and the copper thin sheet 41B of the bus bar 40 may be the opposite in left and right of that shown in FIG. 3B. In this case, the wire connection portion 42 is formed of the aluminum thin sheet 41A. Furthermore, the end portion of the bus bar 40 on which the wire connection portion 42 is formed is not necessarily limited to the end portion 41E in the direction in which the plurality of power storage elements 61 are lined up, in other words, a short-side end portion. The wire connection portion 42 may also be formed, for example, on an end portion of the bus bar 40 in the direction perpendicular to the direction in which the plurality of power storage elements 61 are lined up, in other words, a long-side end portion of the bus bar 40.

An end portion 20E of the detection wire 20 is connected to the wire connection portion 42. Specifically, as shown in FIG. 3A, the wire connection portion 42 includes a core wire connection portion 43 to which the core wire 21 of the detection wire 20 can be connected. Also, the core wire connection portion 43 includes a first core wire connection portion 43A for drawing out the detection wire 20 in one direction, for example, the direction of arrow Y1 in FIG. 3A, and a second core wire connection portion 43B for drawing out the detection wire in another direction that is different from the one direction, for example, the direction of arrow Y2 in FIG. 4A. In other words, in this embodiment, as shown in FIGS. 3 and 4, the directions in which the detection wire 20 can be drawn out from the bus bar 40, namely one direction (direction of arrow Y1), and another direction (direction of arrow Y2) that is different from the one direction are opposite directions and form a 180-degree angle.

In addition, the wire connection portion 42 has a crimping portion (insulation barrel portion) 44 that can be crimped to the insulating coating 22 of the detection wire 20. Specifically, the crimping portion 44 is constituted of a pair of opposed crimping pieces 44P. As shown in FIGS. 3A and 4A, the crimping portion 44 is provided between the first core wire connection portion 43A and the second core wire connection portion 43B. In other words, the first core wire connection portion 43A and the second core wire connection portion 43B are provided on respective sides of the crimping portion 44. Note that the bus bar 40 is provided with a through hole 45 for performing the task of crimping the crimping portion 44 to the insulating coating 22 of the detection wire 20.

FIG. 3 shows how the detection wires 20 are connected to the bus bars 40 arranged in a lower row of the bus bars 40 that are lined up in two, upper and lower, rows in a horizontal direction in FIG. 1. On the other hand, FIG. 4 shows how the detection wires 20 are connected to the bus bars 40 arranged in the upper row.

In this embodiment, the two insulating protectors 11 are lined up in the direction in which the plurality of power storage elements 61 are lined up. The insulating protectors 11 are constituted of insulating members such as synthetic resin members or the like. As shown in FIG. 1, the insulating protectors 11 are each provided e.g. with a pair of bus bar holding portions 12 that are open in a vertical direction (a direction perpendicular to a paper surface in FIG. 1) and contain and hold bus bars 40.

Furthermore, the insulating protectors 11 are each provided with a positioning portion 51 that fits to the fitting portion 66 of the power storage elements 61, and the protruding portions 52 that fits to the fitting portions 67 of the power storage elements 61.

The bus bar holding portions 12 have rectangular tube-shaped containing walls 13 inside of which the bus bars 40 are held, insulated from adjacent bus bars 40. These containing walls 13 also function as protecting walls of adjacent electrode terminals 63.

When assembling the above-described wiring module 10 of this embodiment, first, the two insulating protectors 11 are coupled together. Next, the bus bars 40 are accommodated in the bus bar holding portions 12 of the insulating protectors 11. The welded parts of the back surfaces (lower surfaces) of the bus bars 40 accommodated in the bus bar holding portions 12 are exposed downward.

Next, the crimping portions 44 of the wire connection portions 42 are crimped to the insulating coatings 22 of the detection wires 20, using the through holes 45 provided in the bus bars 40, and thus the detection wires 20 are fixed to the wire connection portions 42. In the state where the detection wires 20 are fixed to the wire connection portions 42, the core wires 21 of the detection wires 20 are connected to the first core wire connection portions 43A, or the second core wire connection portions 43B. This connection is performed by soldering, ultrasonic welding, resistance welding, or the like. Next, the detection wires 20 connected to the wire connection portions 42 are arranged at predetermined positions in the insulating protectors 11.

The wiring module 10 assembled in this way is attached to the electrode arrangement surface 62 of the power storage element group 60, by using the protruding portions 52 of the insulating protectors 11, the fitting portions 67 of the power storage elements 61, for example. At this time, the front end portions (upper surfaces) of the electrode terminals 63 come into contact with the lower surfaces, which are exposed downward, of the bus bars 40. In this state, predetermined positions of the bus bars 40 are irradiated with laser light, using a laser irradiation apparatus (not shown) that is arranged above the wiring module 10, and the bus bars 40 and the electrode terminals 63 are welded together through laser welding. In this way, the power storage module 100 as shown in FIG. 1 is completed.

The core wire connection portion 43 of the wire connection portion 42 formed on the bus bar 40 includes two core wire connection portions 43A and 43B, namely the first core wire connection portion 43A for drawing out the detection wire 20 in one direction (direction of arrow Y1), and the second core wire connection portion 43B for drawing out the detection wire 20 in the other direction (direction of arrow Y2) that is different from the one direction. For this reason, due to the first core wire connection portion 43A and the second core wire connection portion 43B, it is possible to draw out the detection wires 20 in different directions with bus bars 40 of a single kind, even if the wire connection portions 42 are formed on the end portions 41E (short-side end portions) of the bus bars 40, in other words, regardless of the end portions of the bus bars 40 on which the wire connection portions 42 are formed. Accordingly, it is not necessary to provide bus bars 40 having different shapes when the detection wires 20 are drawn out in multiple directions relative to the bus bars 40 in consideration of, for example, the layout of the power storage elements. In other words, it is sufficient to prepare bus bars 40 of a single kind when the electrode terminals of the power storage element group 60 in the layout shown in FIG. 2 are connected.

Furthermore, with the configuration in which the crimping portion 44 is provided at one place of the wire connection portion 42 between the core wire connection portions 43A and 43B, it is possible to draw out the detection wires 20 from the bus bars 40 in different directions. In other words, it is possible to draw out the detection wires 20 from the bus bars 40 in different directions with a simple configuration of the wire connection portion 42. Furthermore, in this case, it is possible to impart the function of a holding portion that holds the detection wire 20 to the other core wire connection portion to which the core wire 21 is not connected.

Furthermore, the first core wire connection portion 43A and the second core wire connection portion 43B are provided in the wire connection portion 42 such that the one direction (direction of arrow Y1) and the other direction (direction of arrow Y2) that is different from the one direction are opposite directions. That is to say, the directions in which the detection wire 20 can be drawn out from the bus bar 40, namely the one direction (direction of the arrow Y1), and the other direction (direction of the arrow Y2) that is different from the one direction form a 180-degree angle. In other words, in the wire connection portion 42 according to Embodiment 1, the first core wire connection portion 43A and the second core wire connection portion 43B are respectively arranged above and below the crimping portion 44 in FIGS. 3 and 4. For this reason, in the wiring module 10 in which the bus bars 40 are lined up in two, upper and lower, rows in accordance with the layout of the power storage element 61 as shown in FIG. 1, the connection of the detection wires 20 to the bus bars 40 and the wiring can be handled with bus bars 40 of a single kind, in other words, with wire connection portions 42 of a single kind.

Embodiment 2

Next, Embodiment 2 will be described with reference to FIGS. 5 to 7. Note, that only the structure of the wire connection portion 42 is different from that in Embodiment 1. For this reason, only this difference will be described, the same structures as in Embodiment 1will be denoted by the same reference numerals, and their further description will be omitted. Also, the description of the related modifications of Embodiment 1 will also be omitted.

Similarly to FIG. 1, FIG. 5 shows how the wiring modules 10 are attached to the power storage element group 60. FIG. 6 shows how the detection wires 20 are connected to the bus bars 40 arranged in the lower one of the two, upper and lower, rows in which the bus bars 40 are lined up in the horizontal direction in FIG. 5. On the other hand, FIG. 7 shows how the detection wires 20 are connected to the bus bars 40 arranged in the upper row.

As shown in FIGS. 6 and 7, the electrode wire connection portion 42 in Embodiment 2 is constituted of the first wire connection portion 42A and the second wire connection portion 42B.

Similarly to the wire connection portion 42 in Embodiment 1, the first and second wire connection portions 42A and 42B are formed by punching and bending the copper thin sheet 41B that is part of the bus bar 40. Also, as shown in FIG. 6B, the first and second wire connection portions 42A and 42B are formed on the end portion 41E of the bus bar 40 in the direction in which the plurality of power storage elements 61 are lined up (X direction shown e.g. in FIG. 2).

The first wire connection portion 42A includes the first core wire connection portion 43A and a first crimping portion 44A that can be crimped to the insulating coating 22 of the detection wire 20 when the detection wire 20 is drawn out in one direction (direction of arrow Y1 in FIG. 6A). Specifically, the first crimping portion 44A is constituted of a pair of opposed crimping pieces 44P.

On the other hand, the second wire connection portion 42B includes the second core wire connection portion 43B and a second crimping portion 44B that can be crimped to the insulating coating 22 of the detection wire 20 when the detection wire 20 is drawn out in the other direction (direction of arrow Y2 in FIG. 7A) that is different from the one direction. Specifically, the second crimping portion 44B is constituted of a pair of opposed crimping pieces 44P.

Also, as shown in FIGS. 6B and 7B, the first crimping portion 44A and the second crimping portion 44B protrude outward of the bus bar 40 in plan view.

The wire connection portions 42A and 42B are provided on each bus bar 40 in accordance with the directions in which the detection wire 20 is drawn out from the bus bar 40. In other words, the first wire connection portion 42A is provided for drawing out the detection wire 20 in the direction of arrow Y1 in FIG. 6A, and the second wire connection portion 42B is provided for drawing out the detection wire 20 in the direction of arrow Y2 in FIG. 7A. For this reason, also in this embodiment, it is possible to draw out the detection wires 20 in different directions with bus bars 40 of a single kind, by using the first wire connection portion 42A and the second wire connection portion 42B.

Furthermore, the first crimping portion 44A and the second crimping portion 44B protrude outward of the bus bar 40 in plan view. For this reason, the task of crimping the first crimping portion 44A or the second crimping portion 44B to the insulating coating 22 of the detection wire 20 becomes easy.

Other Embodiments

The technology disclosed in the present specification is not limited to the embodiments described through the above description and drawings, and for example, the following embodiments are also encompassed within the technical scope.

In the above-described embodiments, an example was described in which the first core wire connection portion 43A and the second core wire connection portion 43B are provided in the wire connection portion 42 such that one direction (direction of arrow Y1) and another direction (direction of arrow Y2) that is different from the one direction are opposite directions, in other words, the two directions form a 180-degree angle, but the present invention is not limited thereto. It is also possible, for example, that the first core wire connection portion 43A and the second core wire connection portion 43B are provided such that the one direction (direction of arrow Y1) and the other direction (direction of arrow Y2) that is different from the one direction form a 145-degree angle.

In the above-described Embodiment 2, an example was described in which the first crimping portion 44A and the second crimping portion 44B protrude outward of the bus bar 40 in plan view, but the present invention is not limited thereto. It is also possible that the first crimping portion 44A and the second crimping portion 44B do not protrude outward of the bus bar 40 in plan view.

In the above-described embodiments, an example was described in which the bus bar 40 and the electrode terminal 63 of the power storage element 61 are laser welded to each other, but the technology disclosed in the present specification can be also applied to a wiring module with a configuration in which they are connected by fastening them together with bolts and nuts. In other words, the shape and configuration of the portion that is connected to the electrode terminal 63 of the bus bar is not limited to the shape and configuration as shown e.g. in FIG. 3. A through hole for passing the electrode terminal 63, for example, may be provided in the bus bar.

In the above-described Embodiment 1, an example was described in which the crimping portion 44 is constituted of the pair of opposed crimping pieces 44P as shown in FIGS. 3 and 4, but the present invention is not limited thereto. As shown in FIG. 8, the crimping portion 44 may also be constituted of a single crimping piece 44P. In this case, the through hole 45A may also be formed as a hole obtained by punching out the crimping piece 44P from the copper thin sheet 41B that is part of the bus bar 40.

Similarly, in Embodiment 2, the crimping portions 44A and 44B each may be constituted of a single crimping piece 44P as shown in FIG. 9.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Wiring module
11 Insulating protector
12 Bus bar holding portion
20 Detection wire
21 Core wire
22 Insulating coating
40 Bus bar
42 Wire connection portion
42A First wire connection portion
42B Second wire connection portion
43 Core wire connection portion
43A First core wire connection portion
43B Second core wire connection portion
44 Crimping portion
44A First crimping portion
44B Second crimping portion

The invention claimed is:

1. A wiring module that is attachable to a plurality of power storage elements that each have a pair of positive and negative electrode terminals, the wiring module comprising:
   a bus bar that is configured to connect the electrode terminals of two adjacent power storage elements to each other;
   an insulating protector that includes a bus bar holding portion that is configured to hold the bus bar;
   a detection wire that has a core wire and an insulating coating covering the core wire, is arranged on the insulating protector, and is configured to detect a state of the power storage element; and
   a wire connection portion that is formed on an end portion of the bus bar, an end portion of the detection wire being connected to the wire connection portion;
   wherein the wire connection portion includes a core wire connection portion to which the core wire of the detection wire is connected,
   the core wire connection portion includes:
      a first core wire connection portion for drawing the detection wire out from the wire connection portion in a first direction, and
      a second core wire connection portion for drawing the detection wire out from the wire connection portion in a second direction that is different from the first direction, and
   the wire connection portion is configured such that:
      the first core wire connection portion is electrically connectable to the end portion of the detection wire when the detection wire is drawn out from the wire connection portion in the first direction, and
      the second core wire connection portion is electrically connectable to the end portion of the detection wire when the detection wire is drawn out from the wire connection portion in the second direction.

2. The wiring module according to claim 1,
wherein the wire connection portion includes a crimping portion that is crimpable to the insulating coating of the detection wire, and
the crimping portion is provided between the first core wire connection portion and the second core wire connection portion.

3. The wiring module according to claim 1,
wherein the wire connection portion is constituted of:
   a first wire connection portion including the first core wire connection portion, and a first crimping portion that is crimpable to the insulating coating of the detection wire when the detection wire is drawn out in the first direction, and
   a second wire connection portion including the second core wire connection portion, and a second crimping portion that is crimpable to the insulating coating of the detection wire when the detection wire is drawn out in the second direction that is different from the first direction.

4. The wiring module according to claim 3,
wherein the first crimping portion and the second crimping portion are provided in a state of protruding outward of the bus bar in plan view.

5. The wiring module according to claim 1,
wherein the first core wire connection portion and the second core wire connection portion are provided in the wire connection portion such that the first direction and the second direction that is different from the first direction are opposite directions.

6. The wiring module according to claim 1, wherein the first direction is opposite from the second direction such that a 180-degree angle is formed between the first direction and the second direction.

7. The wiring module according to claim 1, wherein the wire connection portion has a crimping portion that is crimpable to the insulating coating of the detection wire, the crimping portion is constituted by a pair of opposed crimping pieces, the crimping portion is provided between the first core wire connection portion and the second core wire connection portion, and the first core wire connection portion and the second core wire connection portion are provided on opposite sides of the crimping portion.

8. The wiring module according to claim 1, wherein the wire connection portion is formed on the end portion of the bus bar in a direction in which the plurality of power storage elements are lined up.

9. The wiring module according to claim 8, wherein the wire connection portion is formed by punching and bending a thin copper sheet that is a part of the bus bar.

10. The wiring module according to claim 1, wherein an area of the bus bar constituting the first core wire connection portion and an area of the bus bar constituting the second core wire connection portion are different from one another.

* * * * *